April 30, 1968 | P. D. THOMAS | 3,381,144

TRANSISTOR SWITCH

Filed Sept. 20, 1965

INVENTOR.
PRESTON DAVID THOMAS

BY

AGENT

United States Patent Office 3,381,144

Patented Apr. 30, 1968

3,381,144

TRANSISTOR SWITCH

Preston David Thomas, Stamford, Conn., assignor to Ferroxcube Corporation of America, Saugerties, N.Y., a corporation of Delaware Filed Sept. 20, 1965, Ser. No. 488,527
2 Claims. (Cl. 307—254)

ABSTRACT OF THE DISCLOSURE

A transistor switch having a relatively low output impedance in both ON and OFF conditions is constructed with a first transistor responsive to an input pulse for rendering same conductive, and a second transistor which is normally conductive and in response to the input pulse is rendered nonconductive. A diode couples the emitter-collector path of the transistors to an output terminal which reflects the low impedance condition of either transistor in accordance with the state of the switch. An input network of diodes and the parallel combination of a capacitor and a diode-resistor series circuit couples input pulses to the first transistor, whereas the second transistor is biased to respond to the condition of the first transistor. The input network insures the proper operation of the device by providing proper levels of input pulses.

This invention relates to transistor switching circuits and more particularly to a transistor switching circuit having low output impendance in both on and off states.

Transistor switching circuits are gaining wide acceptance because of their ability to operate effectively at low levels and with minimum noise. Such requirements have become increasingly important as modern high speed circuitry becomes increasingly more complex and switching time requirements increasingly shorter. Load and stray capacities represented by a switching circuit load under such conditions now begin to require a charging time approaching the switching time within a significant fraction of the length of the switching cycle itself, thereby reducing the effective length of the switching cycle, and giving rise to inefficient operation.

In high speed memory circuitry, wherein a switching circuit is used to select a particular core within a memory matrix, certain cores are energized by half selection pulses while other cores contain partial energization currents representative of various unselected states. These factors also tend to introduce a large stray and load capacitance to the switching circuit and thereby impose a severe restriction on the switching time necessary to energize a particular core, along with further difficulties concerning spurious or erroneous pulse readings resulting from the time required to charge the stray capacitance before the core itself is actually switched.

Prior transistorized switching circuits very often will present a low output impedance, and thereby enhance the charging time for the circuit load, while in only one state. When switched to its alternate state however, the transistorized switch will represent a much higher impedance. This not only increases the possibility of random error within the system by introducing further variables, but increases the charge or discharge time of the stray capacitance.

To be commercially as well as technically feasible, a switching circuit must be relatively simple, economical and compact.

It is therefore a primary object of our invention to provide a transistorized switching circuit having relatively low output impendance in both on and off states.

It is still a further object of this invention to provide a transistorized switching circuit having low output impedances in both on and off states which is relatively simple in operation and economic in construction.

It is still a further object of our invention to provide a transistorized switching circuit which may, with minor modifications, be utilized in such standard logic circuits as bistable and monostable circuits as well as trigger circuits.

These and further objects of this invention will appear as the specification progresses and will be pointed out in the claims and illustrated in the accompanying drawings, which disclose, by way of example, the principle of the invention and best mode contemplated of applying that principle.

In accordance with the principle of our invention, and in carrying out the above objects, a switching circuit is provided with a first transistor and a second transistor each of similar polarity, both having a common input and a common output. The two transistors are interconnected by means of a biasing network and an asymmetrically conducting impedance such as a diode so that one transistor is in a conducting or "on" state at one time. When the switch is caused to change states, that transistor is rendered nonconductive or "off" while the other is rendered conductive or "on." Since one of the transistors is conducting, in either the "on" or "off" states, the output impedance of the switching circuit will always be represented by the relatively low saturation impedance of the collector to emitter junction of the particular conducting transistor.

The invention will now be described in greater detail in reference to the accompanying drawing wherein.

Figure 1:
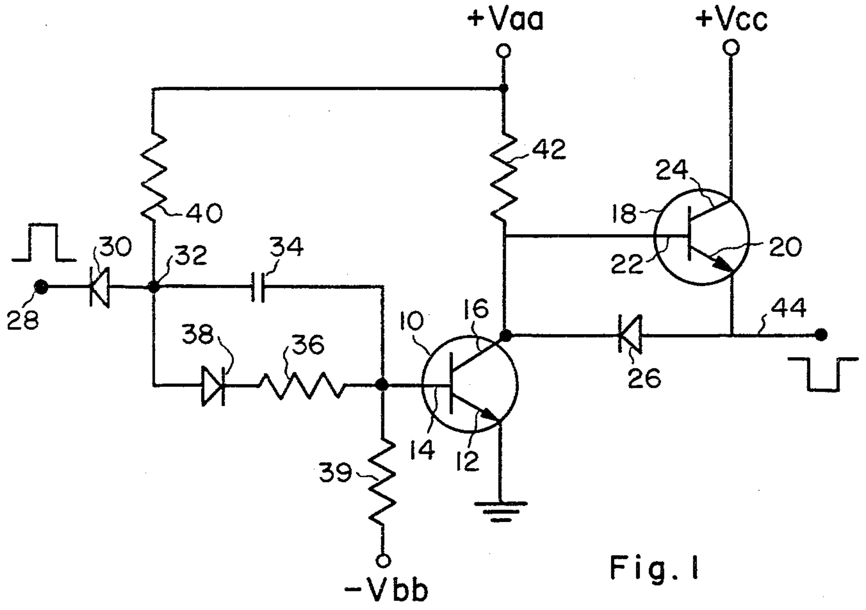
FIGURE 1 shows a two transistor circuit operating in accordance with the principle of the present invention.

Referring now to FIGURE 1, a two transistor switching circuit in accordance with the present invention is comprised of a first transistor 10 having emitter, base and collector electrodes 12, 14 and 16 respectively, a second transistor 18 having emitter, base and collector electrodes 20, 22 and 24 respectively, and an asymmetrically conducting impedance such as diode 26 interconnected between the emitter electrode of transistor 18 and the collector electrode of transistor 10. Input switching signals appear at an input point 28 and are fed through a diode 30 to a common junction point 32. A pulse shaping capacitor 34 and decoupling resistor 36 serve to couple the signal from the junction 32 to the base electrode 14 of the transistor 10. An optional compensating diode 38 may be connected in series with the resistance 36 to further insure switching as described in greater detail below. A voltage $V_{aa}$ supplies a potential through resistance 40 to the common point 32 and through the resistance 42 to the base electrode of transistor 18 and to the collector electrode of transistor 10. A relatively lesser voltage $V_{bb}$ provides a bias potential on the base electrode 14 of the transistor 10. Another voltage $V_{cc}$ supplies a potential to the collector electrode of the transistor 18. The output signal appears along the output line 44.

In operation, the input switching pulse appearing along line 28 will cause the transistor 10 to be driven into saturation by virtue of the biasing arrangement on the base electrode 14, comprising voltages $V_{aa}$, $V_{bb}$ and resistances 40, 36 and 39. Base current to the transistor 10 during saturation is supplied by $V_{aa}$ through resistances 40 and 36. With the transistor 10 in its saturated state, the potential upon collector electrode 16 will be at relatively ground level, thereby causing current to be drawn from source $V_{aa}$ through resistance 42 and from the load along output line 44 through the asymmetrically conducting impedance or diode 26 which is connected so as to pass current in that direction. Because the element 26, in its forward conducting condition, has a low but finite forward impedance, a slight, relatively positive potential with respect to the collector 16 of transistor 10 will appear on emitter 20 of transistor 18. Because base electrode 22 of transistor 18 is at the relatively zero potential of the collector 16 of transistor 10, the emitter-base diode junction of transistor 18 will be back biased, and the transistor 18 will be in a cutoff condition. The relatively low output impedance as seen along output line 44 is measured by the emitter-base-collector junctions of the saturated transistor 10.

When the input pulse along line 28 returns to its low condition, substantially all the current available from $V_{aa}$ will pass through resistance 40 and then through gating diode 30. Because of the low forward conducting impedance of gating diode 30, a potential will appear at common point 32 having a slight relatively positive potential level with respect to the line 28. This potential may be absorbed in the forward conducting resistance of an optional diode 38 to insure proper switching levels at the base of the transistor 10. By virtue of the biasing network comprising resistances 36 and 39, a potential, negative with respect to ground, will appear on base electrode 14 of transistor 10. The emitter-base diode junction of transistor 10 will then be backbiased and transistor 10 will be in a cutoff state. With transistor 10 in cutoff, the potential upon the collector 16 will be approximately equal to the potential of the source $V_{aa}$. This potential appears upon the base electrode 22 of transistor 18, thereby driving transistor 18 into its conductive state. The potential on the emitter electrode 20 of transistor 18 will then rise to approximately $V_{cc}$. Since $V_{aa}$ is larger than $V_{cc}$, the potential at the emitter electrode 20 of transistor 18 will be much less than the potential at the collector electrode 16 of transistor 10, thereby backbiasing element 26. The output appearing upon line 44 will be in a relatively high state, approximating the amplitude of the supply, $V_{cc}$. The relatively low output impedance of the switch along the output line 44 is now a function of the conducting collector-base-emitter junctions of transistor 18.

It is to be understood that although NPN transistors have been shown illustrated and described in connection with the present invention, it would be entirely feasible by standard construction techniques to replace transistors with PNP transistors by providing proper polarity changes with respect to the voltage sources.

The following table illustrates the particular values which may be used to implement the switching circuit. It is to be understood that the following values are exemplary only and are in no way intended to be a limitation or restriction of the invention.

| | | |
|---|---|---|
| Transistor **10** | | 2N709 |
| Transistor **18** | | 2N709 |
| Diode **26** | | 1N916 |
| Diode **30** | | 1N916 |
| Capacitance **34** | pf | 47 |
| Resistance **36** | ohms | 1.8K |
| Diode **38** | | 1N916 |
| Resistance **39** | ohms | 18K |
| Resistance **40** | do | 4.3K |
| Resistance **42** | do | 680 |
| Voltage $V_{aa}$ | volts | +12 |
| Voltage $V_{bb}$ | do | −12 |
| Voltage $V_{cc}$ | do | +6 |

It is to be further understood that the voltage sources may be individual batteries or, as is the more usual practice, may originate in a tapped power supply designed to supply the proper voltages and currents for the particular circuits.

It is noted that the output pulse appearing on the output line 44 will have a maximum level equal to $V_{cc}$ less the voltage drop across the emitter-base-collector junctions of transistor 18, and a minimum level equal to the total of the potential drop across the diode 26 and the emitter-base-collector junctions of the transistor 10. It will be seen therefore, that these levels would be appropriate triggering levels for the switch input and the above circuit values are designed for these levels. This would allow a plurality of switches to be utilized in any desired arrangement. For example, a chain of switches, each energizing the other, would be feasible.

Figure 2:
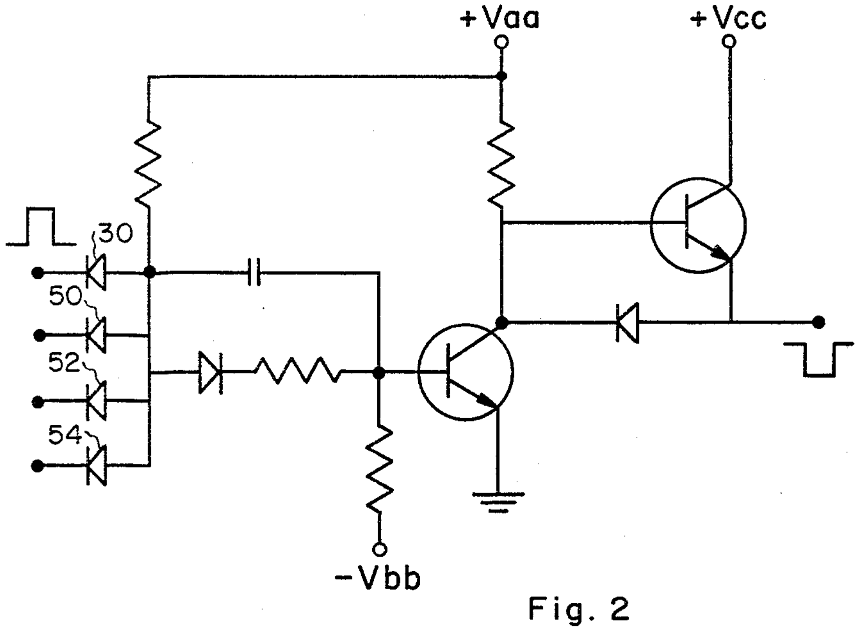
FIGURE 2 shows a modification of the switch for gating operations.

It is further noted that the switch will perform a multiple gating function by the provision of additional gating diodes 50, 52 and 54 at the input of the switch, illustrated in FIG. 2 in a NAND gate configuration.

Other arrangements utilizing the switch are similarly feasible. For example, the switch may be combined with a further switch, and the outputs of each cross coupled to the respective opposite inputs of each so as to form a bistable, astable, or monostable switching unit, depending upon well known design techniques for the requisite cross coupling circuits. Similarly, the switch may be used as a triggering device.

The above cited examples are intended as exemplary only, and while we have described our invention in connection with specific embodiments and applications thereof, other modifications will be apparent to those skilled in the art without departing from the spirit and scope of the invention as defined in the appended claims.

I claim:

1. A transistor switch having an output impedance represented by a conducting collector-emitter junction for both ON and OFF states, comprising a first transistor having emitter, base and collector electrodes, a second transistor having emitter, base and collector electrodes, said first and second transistors being of the same conductivity type, means deriving an output from the emitter electrode of said first transistor, a first diode connecting the emitter electrode of said first transistor to the collector electrode of said second transistor, said diode being connected so as to pass current in the same direction as the collector emitter current path of said second transistor, means connecting the base electrode of said first transistor to the collector electrode of said second transistor, first impedance means applying a first bias potential of a first polarity and magnitude to the junction of said first transistor base electrode and said second transistor collector electrode, second impedance means applying a second bias potential of substantially the same absolute magnitude of said first bias potential but of opposite polarity to the base electrode of said second transistor, means applying a third bias potential of the same polarity of said first bias potential but of lesser magnitude to the collector electrode of said first transistor, means connecting the emitter electrode of said second transistor to a point common to each said bias potential, said circuit arrangement further including an input terminal for receiving input pulses of said first polarity, a second diode having a first terminal connected to said input terminal, said diode being poled in opposition to said input pulses of said first polarity, capacitance means connecting the second terminal of said second diode to the base electrode of said second transistor, a third diode having a first terminal corresponding in polarity to the first terminal of said second diode and a second terminal corresponding in polarity to the second terminal of said second diode, first resistance means connecting said base electrode of said second transistor to the first terminal of said third diode, means connecting said second terminal of said third diode to the second terminal of said second diode, and second resistance means applying said first bias potential to the junction of the respective second terminals of said second and third diodes.

2. The combination of claim 1 including a plurality of further diodes, each having a first terminal corresponding in polarity to the first terminal of said second diode and a second terminal corresponding in polarity to the second terminal of said second diode, means connecting the second terminal of each of said plurality of further diodes to the second terminal of said second diode, and means applying an input pulse to each of said further diodes, said circuit arrangement responsive to a coincidence of input pulses of a first polarity on all of said further diodes and said second diode for causing said circuit arrangement to change state.

References Cited

UNITED STATES PATENTS

| | | | |
|---|---|---|---|
| 3,114,054 | 12/1963 | Gilson et al. | 307—88.5 |
| 3,271,590 | 9/1966 | Sturman | 307—88.5 |

ARTHUR GAUSS, *Primary Examiner.*

J. ZAZWORSKY, *Assistant Examiner.*